INVENTOR.
LOUIS W. PARKER
BY
Moore and Hall
ATTORNEYS

INVENTOR.
LOUIS W. PARKER
BY
Moore and Hall
ATTORNEYS

United States Patent Office 3,041,450

Patented June 26, 1962

3,041,450

BROADCASTING SYSTEMS EMPLOYING A RADIATED UNMODULATED CARRIER WAVE AS A HETERODYNING SIGNAL

Louis W. Parker, 375 Fairfield Ave., Stamford, Conn.

Continuation of application Ser. No. 626,569, Nov. 27, 1956. This application Apr. 25, 1960, Ser. No. 24,618
20 Claims. (Cl. 325—51)

This invention relates to ultra high frequency systems and more particularly to systems for broadcasting television (or other wide band modulated waves) on ultra high frequency bands. In this respect the present invention comprises a continuation of my prior application No. 626,569, filed November 27, 1956 for "Ultra High Frequency Systems," now abandoned, which prior application was in turn a continuation-in-part of my prior abandoned application Serial No. 288,238, filed May 16, 1952, for "Ultra High Frequency Systems"; and Serial No. 280,927, filed April 7, 1952, Patent No. 2,831,105, granted April 15, 1958, for "Television Distributing System."

At present, superheterodyne receivers are used in ultra high frequency (UHF) or super high frequency (SHF) systems of the radio frequency spectrum, but these receivers have several major disadvantages. One of these disadvantages resides in the fact that the degree of frequency stability required in the local oscillator is far greater than can be achieved with a simple inexpensive continuously tuned ultra high frequency oscillator. The superheterodyne receiver also requires radio frequency amplifier stages for blocking current flow from the local oscillator to the antenna and also for eliminating image responses. This invention has as its primary object the provision of an ultra high frequency system which avoids the disadvantages that inhere in ultra high frequency superheterodyne receivers.

The invention utilizes the principle that a modulated UHF or SHF transmitter can broadcast to very high frequency (VHF) receivers with the aid of a UHF or SHF C.W. transmitter which differs in frequency from the modulated transmitter by a frequency within the tuning range of the VHF receivers. These receivers employ a coverter at the antenna and change the two UHF signals to a VHF signal.

An object of the present invention is to provide a system in which this mode of operation can be extended so that low-power UHF transmitters can serve VHF receivers in a large area. The system is extended to provide coverage to any given region by providing additional local C.W. transmitters. Such local C.W. transmitters are not synchronized with other C.W. transmitters covering adjoining regions, yet provision is made for high quality performance even in the areas where two or more of the regions overlap. To this end the invention employs the phenomenon that when several unmodulated frequencies of differing amplitude and frequency operate a frequency converter by heterodyning with a modulated frequency, satisfactory operation can be achieved when one of the unmodulated frequencies has a peak amplitude at least as high as the arithmetic sum of the peak amplitudes of all the others.

To ensure the required predominance of one of the UHF C.W. signals, the invention makes use of directional receiving antennas. This affords the opportunity for discrimination by directional pick-up at the receiver to provide a predominant UHF C.W. signal along with the modulated UHF signal. Special regional situations, such as shaded areas, are met by addition of new modulated UHF transmitters at frequencies on the opposite side of the UHF C.W., separated by the same VHF, or by addition of new sets of modulated and C.W. UHF transmitters at frequencies other than those of the original sets and with the same VHF separation.

Another object of this invention is to provide an ultra high frequency system in which the receivers are lower in cost than those at present employed.

Yet another object of the invention is to provide an ultra high frequency system in which the necessity of crystal controlled oscillators, for the transmitter radiating the carrier, is avoided.

Another object of the invention is to provide an ultra high frequency radio system in which a number of transmitters may be employed to respectively cover different areas not covered by the main transmitter, and in which there is no interference between the several transmitters thus employed.

Other objects and advantages of the invention will appear as this description proceeds.

While I am describing my invention in detail in the following specification, it is understood that the broader aspects of this invention are not limited to the details herein disclosed. The scope of my invention is therefore being defined in the claims.

In carrying out the foregoing objects, I employ an ultra high frequency television transmitter of conventional design operating at a given frequency of say 5,060 megacycles. Instead of a local oscillator at the receiver, I transmit a continuous wave heterodyning signal from another transmitter operating on say 5,000 megacycles. At the receiver, the signals from the two transmitters are mixed in a special mixer which is a cavity resonator that resonates at the two frequencies of the two different transmitters, along two different dimensions of the resonator respectively. There is a pick-up coil which constitutes an output for the resonator and which has a signal therein which is a combination of the signals from the two transmitters. The mixed signals are fed through a crystal rectifier to produce a signal whose frequency is equal to the difference in the frequencies of said transmitters. This latter signal is fed to a conventional very high frequency receiver and amplified in the usual way.

The second transmitter has ten to one hundred times the power of the modulated one since the crystal rectifier requires a certain minimum input in order to operate efficiently. To extend the range of the system it is not necessary to increase the power of the modulated transmitter but merely to place additional high power continuous wave transmitters throughout the area into which the range is to be extended. These additional transmitters should operate on or near the frequency of the first-named continuous wave transmitter (5,000 megacycles in the example given) although the frequency need not be exact.

Beyond the range of the amplitude modulated video signal I may employ an additional video transmitter using another frequency, for example 4,490 megacycles, while still using the same frequency (5,000 megacycles) for the continuous wave signal. If there are a number of shaded areas so that a number of amplitude modulated video signals are necessary, I can use a duplicate system in addition to the first one, with the frequencies of transmission of the duplicate transmitters say 50 megacycles higher than the complementary signals of the first system.

Instead of using separate transmitters for the video signal and the continuous wave signal, I may employ a transmitter operating at say 5,000 megacycles modulated at 60 megacycles with a low percentage of modulation. The video modulation is impressed on the 60 megacycle wave which is a subcarrier.

The frequencies of the transmitters remote from the main central one may be controlled by directly or indirectly comparing their frequencies with the frequency of the transmitter at the central location.

Numerous other features of the invention will appear as this description proceeds.

Figures 1, 2, 3:
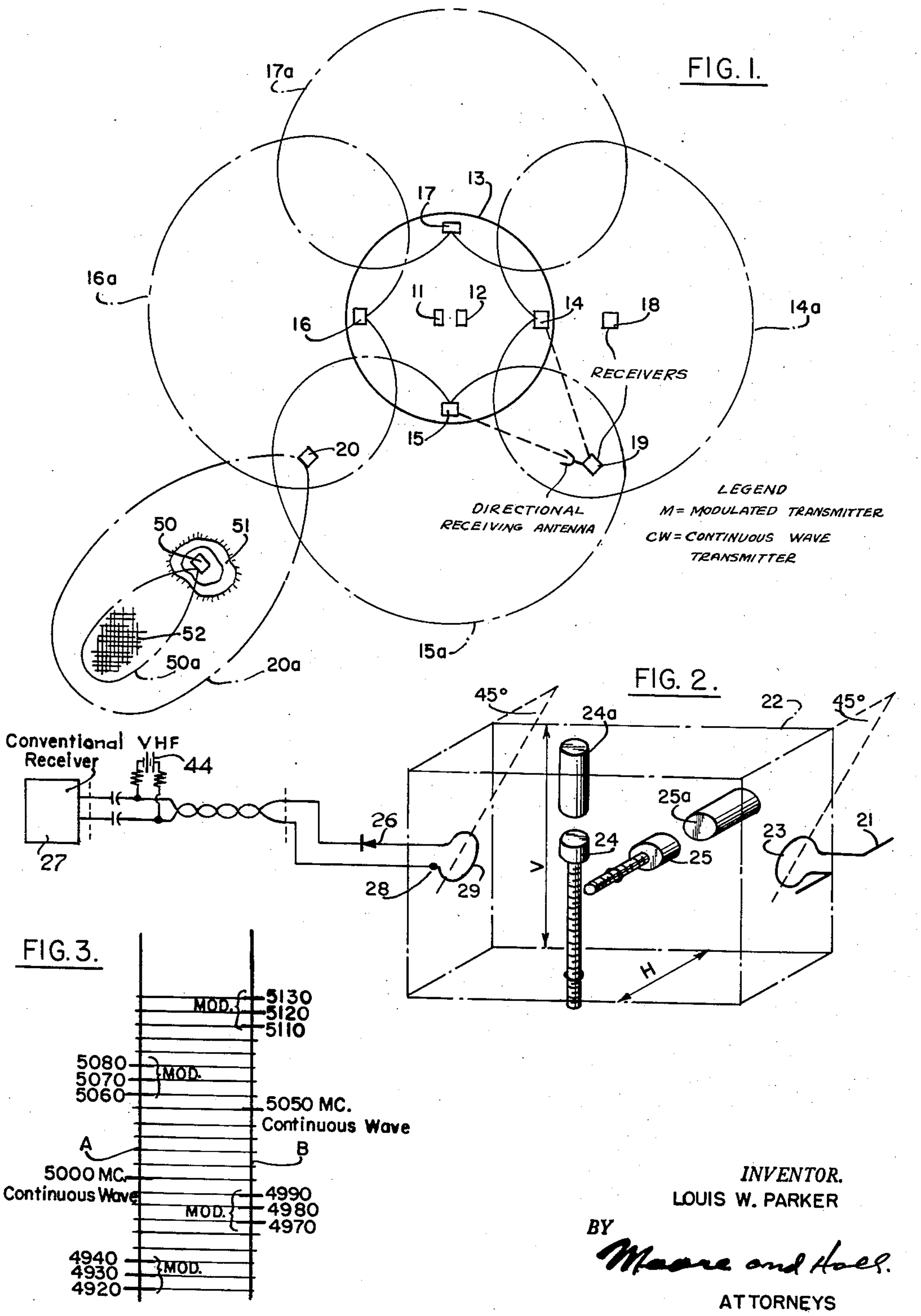
FIGURE 1 is a plan view of an arrangement of antenna radiating elements, which may be used in carrying out the invention.
FIGURE 2 illustrates the mixer that I use at each receiver.
FIGURE 3 illustrates the relative location of the different transmissions, in the spectrum, according to one form of the invention.

In FIGURE 1, a video transmitter having the conventional amplitude modulations on its carrier has an omnidirectional antenna 11. In close proximity to it, although the distance is not critical, there is a second transmitter emitting an unmodulated (continuous wave) signal from its omnidirectional antenna 12. For reasons that will later appear, it is desirable for the signal from antenna 12 to be much stronger than that from antenna 11 and hence the continuous wave transmitter has a power output on the order of ten to one hundred times greater than that of the video transmitter. While other frequencies may be employed in the present illustration, the carrier frequency of the modulated waves from antenna 11 is 5,060 megacycles and that of the unmodulated waves from antenna 12 is 5,000 megacycles.

FIGURE 2 illustrates a mixer used at each television receiver. Dipole antenna 21 picks up signals from both antennas 11 and 12 and feeds these signals to loop 23 which excites the cavity resonator 22. The dimensions H and V of this resonator 22 are slightly different from each other and are so selected that the resonator 22 will oscillate in one plane at 5,000 megacycles and in the other plane at 5,060 megacycles. Exact tuning in the horizontal and vertical planes may be achieved by the use of adjusting screws 24 and 25 which cooperate with complementary metallic capacitor elements 24*a* and 25*a*.

Both the exciting loop 23 and the pick-up loop 29 are mounted in a plane which is displaced 45 degrees from the horizontal in order that these loops may interchange energy with both of the oscillations existing in the cavity resonator 22. Loop 29 is grounded at its lower end 28 to the metal resonator 22 while the upper end connects to the rectifier 26. The output of the loop is fed to crystal rectifier 26 and thence to a conventional VHF receiver 27 which operates at 60 megacycles.

In order for the crystal rectifier 26 to operate well as a mixer in my system it must receive a continuous wave signal (leaving antenna 12), of at least a predetermined minimum value. Circle 13 of FIGURE 1 illustrates the limit beyond which that potential cannot be obtained at the crystal rectifier. The range is to a large degree determined by the power of the unmodulated signal radiated from antenna 12 for the reason that the crystal rectifier requires a certain minimum potential in order to effectively mix the signals. Therefore, the unmodulated transmitter feeding antenna 12 should have a power output many times that of the modulated transmitter, for example ten to one-hundred times. Since there is a certain minimum power necessary for proper operation of crystal rectifier 26, the overall cost of the equipment may be reduced if the larger power is transmitted as an unmodulated signal. Moreover, it is possible to readily extend the range by merely adding additional continuous wave transmitters at remote points, which is one of the important novel features of my invention.

Inasmuch as it is usually impractical to amplify the incoming signals at ultra high frequencies, it is necessary that the crystal rectifier 26 operate at some locations on very weak signals. The minimum value of modulated signal voltage can be very low since it only needs to be above the noise level which may be in the order of 10 microvolts. The minimum value of continuous wave signal voltage however must be determined by different considerations as is explained in the following:

The crystal rectifier 26 may operate in two different ways and the value of the continuous wave signal voltage depends on which of these ways the rectifier operates. If there is only one continuous wave signal present (with any number of modulated channels), there has to be a sufficient minimum voltage from the continuous wave to create appreciable difference in the conductivity of the crystal for opposite directions of current. The lower limit for this voltage is in the order of one millivolt with most good crystals. This type of crystal operation is in fact known to the prior art.

I have discovered, however, that when there are a plurality of asynchronous continuous wave signals present, differing from each other by no more than about one-half megacycle, my system will work perfectly well with substantially no interference, as long as two additional requirements are satisfied at the crystal. First, that one of the continuous wave signals have a peak voltage amplitude which is higher than the sum of all the peak voltages of the other continuous wave and modulated signals present simultaneously at crystal rectifier 26. The second requirement is that the crystal operate substantially on the straight line portion of its voltage current characteristic curve. This latter requirement is satisfied by making the voltage of the largest continuous wave signal more than a certain minimum amount, depending on the properties of the crystal. This minimum value of voltage with presently available crystals is in the order of 0.1 volt peak. In addition, a low D.C. biasing voltage 44 may be added in series with the incoming signals to enable use of less voltage from this latter source. This D.C. biasing voltage may vary from a few millivolts to 0.2 volt depending on the properties of the crystal. However, the use of such bias is optional, as it is only necessary with moderately weak signals.

Without disturbing antennas 11 and 12 (together with their associated transmitters), I may extend the range by adding four antennas 14, 15, 16 and 17. All of these antennas are fed by continuous wave transmitters operating at 5,000 megacycles (which frequency is maintained with an accuracy defined by limits of plus or minus 200 kilocycles). These transmitters are directional and respectively produce lobes 14*a*, 15*a*, 16*a* and 17*a*. With this arrangement satisfactory reception is possible within any of the areas covered by lobes 13 and 14*a* to 17*a* inclusive. For example, a receiver 18 will receive a powerful continuous wave signal at 5,000 megacycles, from antenna 14 which is sufficient to provide the necessary radio frequency potential of said predetermined minimum value or more at the crystal rectifier 26. When this condition has been met, the mixer of FIGURE 2 will operate satisfactorily as long as the unmodulated signal from antenna 11 produces the required potential at the crystal rectifier 26. It is apparent, therefore, that once a high power heterodyning signal is received, reception of the modulated signal is possible even though the receiver is at a considerable distance from the antenna 11.

Unless the several continuous wave transmitters feeding antennas 12, 14, 15, 16 and 17 are synchronized, it is desirable that they have a minimum of overlapping of their lobes. The arrangement shown in FIGURE 1 is satisfactory in this regard. If the frequencies of the continuous wave transmitters are allowed to vary as much as 200 kilocycles it will not matter. As long as the signal at the receiver from one of the continuous wave transmitters is very strong it will not matter if weak continuous asynchronous signals on slightly different frequencies are also received. The signal received from the closest continuous wave transmitter should preferably be three to four times as many volts as that received from any other continuous wave transmitter. This condition is not met at receiver 19 which is almost equally distant from antennas 14 and 15; hence it would be desirable for the receiver 19 to employ a directional antenna beamed at one or the other of antennas 14 and 15, unless of course the transmitters feeding antennas 14 and 15 have their frequencies synchronized.

The reason why a radio frequency signal from antenna 15 will not interfere appreciably with reception at receiver 18, assuming that the signal from antenna 14 is several times stronger than that from antenna 15 will now be explained. The signal from antenna 15 will have an effect on that from antenna 14 very much the same as a single sideband would. In other words it will amplitude and phase modulate the signal from antenna 14. The theoretical explanation of this is elaborated upon in my U.S. Patent 2,448,908 where I pointed out that a small amplitude modulation, on a large amplitude carrier which carrier heterodynes another carrier of small amplitude, will not be transferred to the beat frequency. However, any modulation of the carrier of smaller amplitude will be transferred to the beat frequency. In view of this, any amplitude variation in the signal from antenna 14 will not affect the output signal from receiver 18. Any phase modulation caused by the signal from antenna 15 will affect the more powerful signal from antenna 14 and this phase modulation will pass through the entire receiver up to the second detector. This detector is a simple rectifier and is therefore insensitive to phase modulation; consequently the output will be the same as though there had been no phase modulation.

If reception in additional territory is desired an additional continuous wave transmitter feeding antenna 20 may be employed in order to furnish a lobe 20*a* covering the added territory.

It is understood that since the transmitters feeding antennas 14, 15, 16 and 17 need not be accurately controlled that they may be self-excited oscillators in which tuned circuits, as distinguished from crystals, are relied upon to determine the frequency of transmission.

In cases where the continuous wave signal comes from a different direction than the signal from transmitter 11, two separately oriented directional antennas feeding a common cavity resonator may be used. Alternatively, each of the two directional antennas may feed separate cavity resonators whose outputs are combined. In the great majority of cases the refinements mentioned in this paragraph are unnecessary.

Until now, only the continuous wave transmitters have been discussed in multiple use and it has been assumed that the amplitude modulated transmitter, while having much reduced field strength at the distant locations is still able to supply enough signal voltage to operate the average television receiver. This situation can be justifiably applied to most medium or even large size cities. However, if hills or large buildings create a shaded area, it is necessary to set up one or several more additional amplitude modulated transmitters. In the case of these transmitters, the previously discussed idea of operating transmitters (such as feed antennas 14 to 17) on approximately the same frequency does not apply.

When and if it becomes necessary to use an additional modulated transmitter within the field of another, that new transmitter must use a different frequency, unless the field strength of the old transmitter is well below 50 microvolts per meter through the entire region of operation. A very weak signal can be swamped by a much larger one but attention must be paid to the effect of the newly added transmitter on receivers within the operating range of the older transmitter. In most cases it will be found desirable to use another frequency for a transmitter operating in an area within close proximity of another.

Such new frequency however need not be noticeable to the operator of the receiver. On line A of FIGURE 3 a situation is illustrated diagrammatically where a set of modulated transmitters are located both above and below the frequency (5,000 megacycles) of the continuous wave transmitter. Both higher (5,060 megacycles) and lower (4,940 megacycles) frequencies are spaced an equal frequency difference (60 megacycles) away from the unmodulated transmitter. Consequently, when either the higher or lower frequencies are heterodyned with the continuous wave carrier, the beat frequency is the same. This situation applies of course not only to one but to any number of transmitters. Separation of the upper and lower frequency signals is accomplished by the cavity resonator at the receiving antenna and by the directionality of the pick-up system. The cavity resonator can differentiate about 40 decibels, while the antenna array can differentiate up to 20 decibels. Hence, the unwanted signal may be reduced by 60 decibels, which is generally considered satisfactory.

If the "dead spots" or shadows are not near one another, several transmitters on the same lower heterodyning frequency (4,940 megacycles for example) may be used at very low power (one for each dead spot), in addition to the regular higher power transmitters on the upper frequency bands. Where this cannot be done without interference, another set of frequencies as shown on line B of FIGURE 3 will permit additional separation. Still the operator need not be aware that he is not receiving the original transmitter, since the frequencies reaching his VHF receiver will always be the same. The cavity resonators can be made to have sufficient tuning range to cover all the frequencies that may be used. Tuning these units is accomplished by the serviceman making the installation. After that, the operator of the receiver need not be aware of where the video signals originate.

The transmitters used in this system can be greatly simplified, due mainly to the abundant space allowable in the UHF range of the spectrum.

Figure 4:
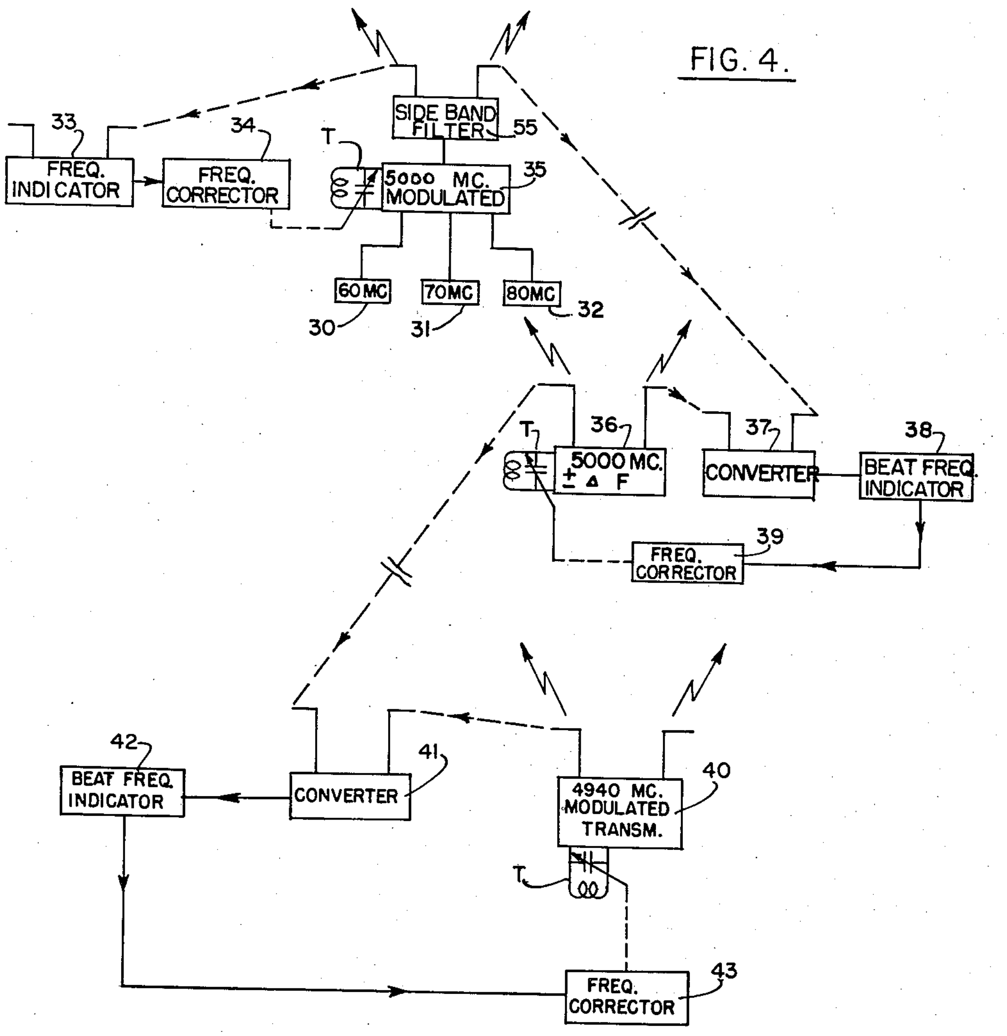
FIGURE 4 is a block diagram of apparatus capable of carrying out one form of the invention.

Instead of using a different transmitter and antenna for the continuous wave signal than is used for the modulated signal, the antennas 11 and 12 as well as their transmitters may be combined as shown in FIGURE 4. Transmitter 35 may operate at 5,000 megacycles and it may be modulated by the very high frequency video transmitter 30. If the percentage of modulation exercised by the 60 megacycle transmitter 30 on transmitter 35 is low, for example 30%, it is clear that the carrier of transmitter 35 produces a signal corresponding to that leaving antenna 12 of FIGURE 1. The 5,000 megacycle carrier has a 5,060 megacycle upper side band which is weaker than the carrier due to the low percentage of modulation. This upper side band corresponds to the signal radiated from antenna 11 to FIGURE 1.

Transmitter 35 may also be modulated by video transmitter 31 operating at 70 megacycles and also by video transmitter 32 operating at 80 megacycles. Therefore, as shown on line A of FIGURE 3 there will be a carrier at 5,000 megacycles and three upper side bands at 5,060, 5,070, and 5,080 megacycles. There will also be three lower side bands at 4,940, 4,930 and 4,920 megacycles which may be eliminated by filters in event that they would interfere with other transmissions or in the event that these lower frequencies are used by transmitters operating in shaded areas as described hereinabove. In any event, the VHF receiver 27 of FIGURE 2 may select the program of any one of transmitters 30, 31 or 32 by suitable adjustment of its tuning circuit.

Each of the 5,060, 5,070 and 5,080 megacycle frequencies may be considered as subcarriers modulated by a television signal. These subcarriers have side bands that are nearly 5 megacycles wide, and which can be retained without a vestigial side band filter. However, the receiver need only respond to one side band, say from 60 to 65 megacycles as is now conventional on vestigial side band receivers. Accuracy of frequency is required so far as the transmitters 30, 31 and 32 are concerned, and hence these may be crystal controlled. The sound may be transmitted as a 4.5 megacycle frequency modulated side band, added originally to the video signal modulating transmitters 30, 31 and 32. Transmitter 35 need not be accurately frequency controlled, since the somewhat loaded cavity resonator 22 on the receiving end may have a Q in the order of 100. This corresponds to a bandwidth three decibels down of 50 megacycles. Therefore, an inaccuracy of 0.1% (or five megacycles) will not be noticeable. Crystal control is not necessary to get this accuracy, and therefore the numerous multiplier stages usually required may be dispensed with. The frequency of transmitter 35 may be measured in the well known manner by a cavity resonator 33. If the frequency has deviated from the assigned frequency by more than a few megacycles it may be reset manually or automatically by the frequency corrector 34.

In FIGURE 4, I have shown tunable cavity resonators T (schematically illustrated as an inductor and a capacitor in parallel) for controlling the frequencies of transmitters 35 and 36. These transmitters may be self-excited oscillators if desired.

With the apparatus described in FIGURE 4, a separate continuous wave transmitter at the center of circle 13 is eliminated, but simple continuous wave transmitters operating at or near 5,000 megacycles are still employed to feed antennas 14, 15, 16, 17 and 20 in order to produce the necessary signal strength at locations outside of circle 13.

The transmitters which feed antennas 14, 15, 16, 17 and 20 of FIGURE 1 may conform to transmitter 36 of FIGURE 4. Crystal converter 37 picks up the complete signal from transmitter 35 and also the 5,000 megacycle signal from transmitter 36. In view of the very large amplitude of the 5,000 megacycle signal from transmitter 36 at that location as compared with the amplitude of 5,000 megacycle signal from transmitter 35, the 60 megacycle beat note will be the result of the signal of transmitter 36 beating with the upper side band (5,060 megacycles) of transmitter 35. The frequency of this beat note is measured by the frequency indicator 38, and if incorrect may be reset manually or automatically by the frequency corrector 39. Preferably this frequency should be held within 0.12 megacycle of its assigned value.

As has been stated for additional coverage, the lower side band frequencies are sometimes eliminated by filters 55 from the output of transmitter 35, and these frequencies used by separate transmitters located in areas where inexpensive broadcast receivers cannot receive signals from transmitter 35. Transmitter 40 is such a transmitter and may be used at location 50 of FIGURE 1 which is at the top of a hill 51 that shades town 52 from direct reception of signals from antenna 11. In this case the converter 41 receives signals from both the 4,940 megacycle transmitter 40 and the 5,000 megacycle transmitter 36 (which may be located at point 20 in FIGURE 1). The frequency corrector 43 is then adjusted manually or automatically until the beat frequency indicator 42 indicates the desired frequency (60 megacycles).

By the use of the invention as described hereinabove all the important disadvantages of UHF television broadcasting are eliminated. The important disadvantage of oscillator radiation and too high a requirement for local oscillator accuracy at the receiver is solved by entirely eliminating the UHF local oscillator from the receiver. Image rejection trouble is eliminated by using a fixed UHF frequency and a selective fixed tuned cavity resonator at the antenna. The cost of the receiver is kept practically the same as that of a low frequency receiver. The cost of the transmitter is reduced by eliminating the need for very high frequency accuracy and by the use of a simple automatic frequency control. Shadows in the transmitting range are eliminated by using several small transmitters on different frequencies to boost the signal in such areas. These small transmitters do not need operating personnel and may be turned on and off by remote control.

As has been stated hereinabove, the continuous wave signals from antenna 12 may have some modulation on them without affecting the operation of the system, although preferably they should be pure continuous waves. Therefore, the words "continuous waves" are used in the claims to include not only pure continuous waves but those which have so low a percentage of modulation that they act in this system as continuous waves would act.

I claim to have invented:

1. A system for broadcasting ultra high frequency modulated signals comprising means for producing a continuous wave signal and a modulated signal respectively on first and second spaced ultra high frequencies, first antenna means for broadcasting said signals from a predetermined location, additional means for producing an additional continuous wave signal at substantially said first frequency, and directional antenna means located near the limit of the effective range of the continuous wave signal for radiating the additional continuous wave signal in a direction away from the first antenna means.

2. The system of claim 1 in which the first antenna means is omni-directional, the continuous wave signals having relatively high power as compared with that of the modulated signal.

3. The system of claim 2 in which there are a plurality of transmitters producing continuous waves on substantially said first frequency, and a plurality of directional antennas fed by said transmitters for broadcasting their outputs away from the first antenna means along radii originating at the first antenna means, the plurality of directional antennas being spaced from each other and located near the limit of the effective range of the signals from the first antenna means.

4. A system as defined by claim 1 having transmitter means for broadcasting modulated signals on a third frequency, said second and third frequencies being substantially equally spaced from the first one and on opposite sides of the first one.

5. A system as defined by claim 4 in which the transmitter means is located in an area outside of the effective range of the first modulated signal, and means for broadcasting a continuous wave signal on the first frequency throughout the area covered by said transmitter means.

6. An ultra high frequency television broadcasting system comprising means for generating an ultra high frequency video signal and a frequency modulated sound signal located adjacent to and outside the band of the video signal; means for generating an ultra high frequency continuous wave signal spaced from the video signal by a very high frequency that falls in another band in which television stations operate; said continuous wave signal having relatively high power compared to the video signal; omni-directional antenna means for radiating the signals generated by the first and second named means so that the two may be heterodyned and rectified and then by means of a very high frequency receiver designed to operate in said very high frequency band demodulated, throughout a given area covered by said radiated signals; and means for extending the area in which reception may occur comprising a plurality of additional means for radiating continuous wave signals on frequencies substantially the same as that of the second named means and radiating the additional continuous wave signals primarily outside of the first named area so that in areas adjacent to and outside of the first named areas there are high power continuous wave signals in addition to the low power radiations of the first named means, the first named means being the only means for supplying to said extended areas video signals at the frequency on which it operates; each of said plurality of additional means including a directional antenna beamed away from the third named means and spaced from the others to reduce the areas covered by two of said plurality of additional means.

7. An ultra high frequency television broadcasting system as defined in claim 6 in which the radiations from said directional antennas produce field strength throughout said extended area which is relatively large as compared to the field strength of the video signals.

8. An ultra high frequency television transmission system comprising means for generating an ultra high frequency video signal and a frequency modulated sound signal located adjacent to and outside the band of the video signal; means for generating an ultra high frequency continuous wave signal spaced from the video signal by a very high frequency that falls in another band in which television stations operate; said continuous wave signal having relatively high power compared to the video signal; omni-directional antenna means for radiating the signals generated by the first and second named means so that the two may be heterodyned and rectified and then by means of a very high frequency receiver designed to operate in said very high frequency band demodulated, throughout a given area covered by said radiated signals; and means for extending the area in which reception may occur comprising a plurality of additional means for radiating continuous wave signals on frequencies substantially the same as that of the second named means and radiating the additional continuous wave signals primarily outside of the first named area so that in areas adjacent to and outside of the first named area there are high power continuous wave signals in addition to the low power radiations of the first named means, the first named means being the only means for supplying to said extended areas video signals at the frequency on which it operates; each of said plurality of additional means including a directional antenna beamed away from the third named means and spaced from the others to reduce the areas covered by two of said plurality of additional means; and additional means for broadcasting television signals into an area covered by at least one of the continuous wave signals on a frequency spaced from that of the second named means by the same amount that the first named means is spaced from the second named means, the two video signals being respectively on opposite sides of the frequency of the second named means.

9. A system as defined in claim 5 including in addition: additional transmitter means for broadcasting continuous wave and modulated signals over an area not covered by the other transmitters, the last named continuous wave and modulated signals being spaced apart the same as the other continuous wave and modulated signals whereby each set of continuous wave and modulated signals have the same beat frequency, one of the signals of the additional transmitter means having a frequency between said first and second frequencies, all of said modulated signals carrying the same program.

10. In an ultra high frequency television broadcasting system as defined in claim 6; said first named means comprising a very high frequency signal generator that modulates the second named means at said very high frequency.

11. In combination, a system for broadcasting ultra high frequency modulated signals as defined in claim 1, and receiving means located within the range of said system comprising resonant means fed by at least one of the continuous wave signals and by the modulated signal and producing an output which is at the beat frequency between those two signals, rectifier means fed by the output of the resonant means and comprising a rectifying element adapted to suppress the production of beats caused by the continuous wave signal from one of said antennas while passing beats caused by the other if the continuous wave signals have widely different amplitudes, and a very high frequency receiver fed by the output of the rectifier means.

12. The combination recited in claim 11 including means, comprising a directional antenna, for feeding the resonant means to increase the difference in amplitudes between the two continuous wave signals.

13. A system for broadcasting ultra high frequency signals comprising means for transmitting a continuous wave signal at a first ultra high frequency, means for simultaneously transmitting modulated ultra high frequency signals adapted to be heterodyned with said continuous wave signal thereby to produce a very high frequency signal comprising a beat frequency between said continuous wave and modulated ultra high frequency signals, said last-named means comprising means transmitting two distinct modulated ultra high frequency signals from two different locations at second and third different ultra high frequencies respectively, said second and third modulated ultra high frequency signals covering different areas of reception respectively, said second and third ultra high frequencies of said two modulated signals being substantially equally spaced from and on opposite sides of said first frequency of said continuous wave signal, each of said second and third modulated ultra high frequencies being spaced from said first continuous wave frequency by substantially the same very high frequency difference whereby similar very high frequency beats are obtainable both above and below the frequency of said continuous wave signal upon the heterodyning of said continuous wave and modulated ultra high frequency signals.

14. In a system for broadcasting ultra high frequency modulated signals as claimed in claim 6, a plurality of receiving means located within the area covered by said system each comprising resonant means responsive to both said continuous wave and said modulated ultra high frequency signals, crystal rectifier means fed by the output of said resonant means, amplitude selective means to cause one of the continuous wave signals of comparable field strength received by said receiving means from more than one of said omnidirectional and said additional antenna means to have a strength higher than the sum of the combined strengths of the other continuous wave and modulated signals simultaneously present at the input of said receiving means for producing very high frequency beat signals by said first continuous wave signal and suppressing beat signals by the remaining of said continuous wave signals, and a very high frequency receiver fed by the output of said rectifier means.

15. A broadcasting system as claimed in claim 14, wherein said amplitude selective means comprises directional receiving antenna means for feeding said resonant means, to increase the difference in amplitude between different continuous wave signals present at the input of said receiving means.

16. In a radio broadcasting system, means for simultaneously broadcasting at least one modulated high frequency signal at a first frequency and a plurality of continuous wave high frequency heterodyning signals all having a frequency approximately equal to a predetermined second frequency, said first and second frequencies being located within the ultra high or super high frequency broadcast band and being spaced from one another by a frequency difference equal to a frequency in the very high frequency broadcast band, each of said high frequency continuous wave signals being broadcast from different geographical locations with a transmission power related to the transmission power of said modulated high frequency signal to cause the received heterodyning signals within the area covered by said system to be large compared with the received modulated signal, receiving means located within said area, said receiving means including resonant means responsive to both the modulated and continuous wave ultra or super high frequency signals, and further including crystal rectifier frequency changing means connected to the output of said resonant means for converting the received modulated ultra or super high frequency signals into modulated signals in the very high frequency broadcast band, means operatively associated with the receiving means located within regions of said area normally receiving signals of comparable field strength from at least two continuous wave transmissions to cause one of the received continuous wave heterodyning signals to have a peak amplitude higher than the arithmetically combined amplitudes of the other heterodyning and the modulated signal simultaneously present at the input of said receiving means, and said receiving means including a very high frequency receiver fed by the output of said rectifier means.

17. In a radio broadcasting system, transmitter means for simultaneously broadcasting at least one modulated high frequency signal having a first carrier frequency and a plurality of continuous wave high frequency heterodyning signals all having a frequency approximately equal to a predetermined second frequency, said first and second frequencies being located within a first relatively high broadcast frequency band and being spaced from one another by a frequency difference corresponding to a third frequency located within a second relatively lower broadcast frequency band, each of said continuous wave high frequency signals being broadcast from different geographical locations with a transmission power related to the transmission power of the modulated high frequency signals to cause the received heterodyning signals within the area covered by said system to be large compared with the received modulated signal, receiving means within said area each including resonant means responsive to both said modulated and said heterodyning frequency signals, and further including unidirectional conductive means connected to the output of said resonant means for converting the received modulated signals into a modulated signal within said second frequency band, amplitude selective means associated with the receiving means located within regions of said area normally receiving signals of said second frequency of comparable field strength from at least two heterodyning frequency transmissions, to cause one of the heterodyning signals to have a peak amplitude higher than the arithmetically combined amplitudes of the other heterodyning and the modulated signal simultaneously present at the input of said receiving means, and said receiving means including a receiver designed for said lower frequency band fed by the output of said unidirectional conductive means.

18. In a radio broadcasting system as claimed in claim 17 including beamed transmission means for at least part of said heterodyning signals, to reduce the size of said regions within said area.

19. In a radio broadcasting system as claimed in claim 17, wherein said amplitude selective means is comprised of directional receiving antenna means to cause one of the received heterodyning signals originating from one of the continuous wave transmissions to dominate the signals originating from the other continuous wave transmissions.

20. In a broadcast system as claimed in claim 17, means for broadcasting said modulated high frequency signal and one of said continuous wave high frequency signals being comprised of a high frequency generator producing a signal at said first frequency, means to produce a modulated carrier signal at said third frequency, and further means to amplitude modulate said first signal by said last-mentioned modulated signal.

References Cited in the file of this patent

UNITED STATES PATENTS

| | | |
|---|---|---|
| 2,140,730 | Batchelor | Dec. 20, 1938 |
| 2,425,352 | Sloss | Aug. 12, 1947 |

FOREIGN PATENTS

| | | |
|---|---|---|
| 596,053 | Germany | Apr. 26, 1934 |

OTHER REFERENCES

"Microwave Mixers," vol. 16, M.I.T. Series, McGraw-Hill, 1948, sec. 2, 4 pp. 56–59.